United States Patent
Sato

[11] 3,812,604
[45] May 28, 1974

[54] SHOE CONSTRUCTION AND METHOD OF MANUFACTURING A SHOE

[75] Inventor: Tomoyoshi Sato, Tokyo, Japan

[73] Assignee: Nihon-Yohin Co., Ltd., Chiyoda-ku, Tokyo, Japan

[22] Filed: Aug. 28, 1972

[21] Appl. No.: 284,106

[52] U.S. Cl............................... 36/14, 12/142 RS
[51] Int. Cl.......................... A43c 13/08, A43d 9/00
[58] Field of Search......... 12/142 R, 142 RS; 36/14, 36/25 R, 30 R, 32 R

[56] References Cited
UNITED STATES PATENTS

| | | | |
|---|---|---|---|
| 2,786,237 | 3/1957 | Keen et al. | 12/142 RS |
| 3,334,426 | 8/1967 | Worsick | 36/14 |
| 3,466,684 | 9/1969 | Rollman | 12/142 RS |
| 3,510,968 | 5/1970 | Hobbs et al. | 36/14 |

*Primary Examiner*—Patrick D. Lawson
*Attorney, Agent, or Firm*—McGlew and Tuttle

[57] ABSTRACT

A shoe includes an instep which is joined to a bottom layer by an intermediate layer which is bonded between the instep and the bottom layer. The intermediate layer is advantageously applied in a liquid form after first positioning the bottom layer at the bottom of a mold and positioning the instep so that its lower inturned edges project into the mold. The liquid in the form of a synthetic plastic is permitted to fill the space between the bottom layer and the instep and to be cooled and become bound to these parts. In one embodiment, the bottom layer is advantageously made of an upper and lower superposed layer part with the upper layer having at least one through opening to permit the flow of the intermediate bonding layer therethrough and securement to a recess of the lower part of the bottom layer. In one form the shoe includes a bottom layer made up of upper and lower parts which are joined together by the bonding layer which flows through openings in the upper part into receiving recesses or bores of the lower part. The lower part may advantageously includes a bottom having corrugations or projections and which either includes recesses or receiving bores for the bonding material which extends therethrough.

8 Claims, 25 Drawing Figures

SHOE CONSTRUCTION AND METHOD OF MANUFACTURING A SHOE

BACKGROUND OF THE INVENTION

1. Field of the Invention

This invention relates in general to shoe construction, and, in particular, to a new and useful method of manufacturing a shoe by joining a lower bottom layer of the shoe to the shoe instep by applying a liquid bonding layer between the instep and the bottom layer to bond the two layers together and, to a new and useful shoe construction.

2. Description of the Prior Art

At the present time, the known shoe constructions using synthetic resin for forming the bottom portion or sole of the shoe have the disadvantage that the synthetic resin is too soft and is particularly unsuitable for a sport-type shoe. In addition, with shoes formed of this material, it is difficult to apply rivets or other cleat elements to suit the shoe for climbing purposes.

SUMMARY OF THE INVENTION

In accordance with the present invention, there is provided a shoe which includes a bottom which may be formed of durable material and which is bonded to the instep by means of a synthetic resin material which is applied as an intermediate layer between the instep and the bottom. With the method of the invention, the shoe is formed by positioning a bottom into the lower end of a mold and mounting an instep on the mold so that the periphery extends into the mold. Thereafter, a synthetic resin material is applied between the instep and the bottom while it is in a liquid form, and it is permitted to cool and harden to bond the bottom to the instep. In a form of the invention, the bonding layer extends through blind bores or slots into the bottom layer. In addition, the bottom layer may be made up of one or more additional layer portions which are bonded together by the bonding layer which extends through openings of one layer into receiving recesses or bores of the other.

Accordingly, it is an object of the invention to provide an improved method of making a shoe in which a durable bottom layer is secured to a shoe instep by applying it in liquid form between the instep and the bottom layer to bond the bottom layer to the instep.

A further object of the invention is to provide an improved shoe which includes a bottom formed of one or more parts which are superposed and which are bonded to a shoe instep by a bonding layer of synthetic resin material and wherein the bottom layer advantageously includes one or more receiving openings or recesses into which the bonding material extends.

A further object of the invention is to provide a method for manufacturing a shoe which is suitable for climbing, or other walking or sporting use, and utilizes an injection-forming process.

A further object of the invention is to provide a strong shoe which is not subject to stripping of the sole by differences of stretch and contraction between the sole and the synthetic resin layer which forms a part thereof and which might possibly result because of temperature changes or impact.

A further object of the invention is to provide a shoe construction which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
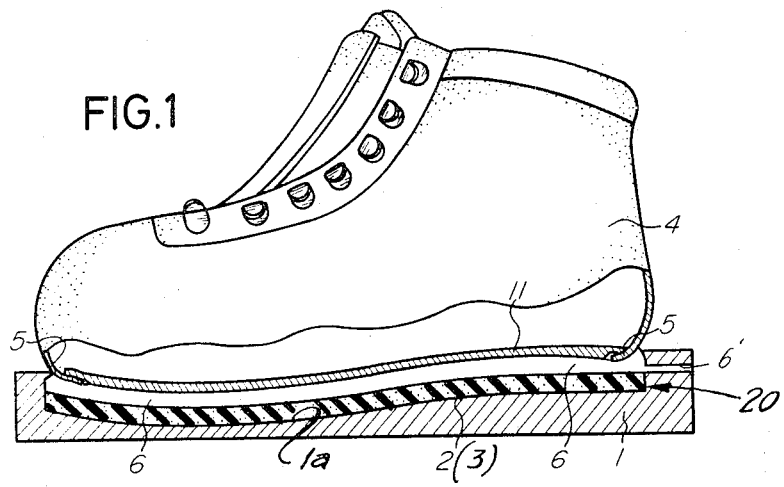
FIG. 1 is a side elevational view partly in section of a first step of a manufacturing process for forming a shoe constructed in accordance with the invention.
Figure 2:
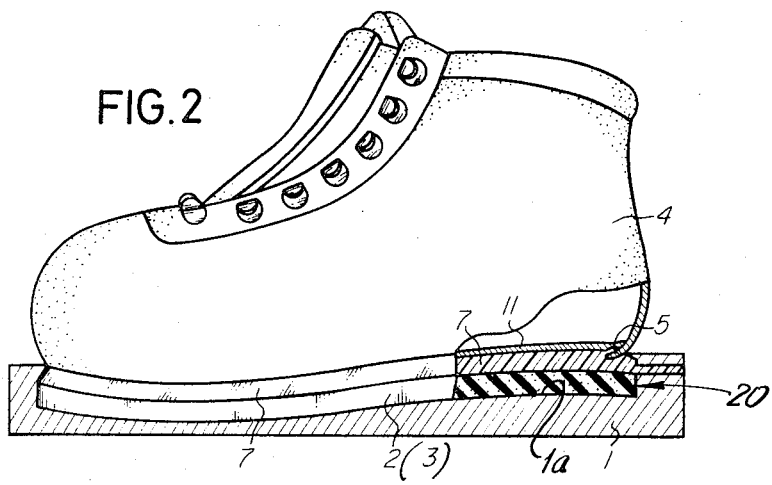
FIG. 2 is a view similar to FIG. 1 indicating the second step in the construction of the shoe.
Figure 3:
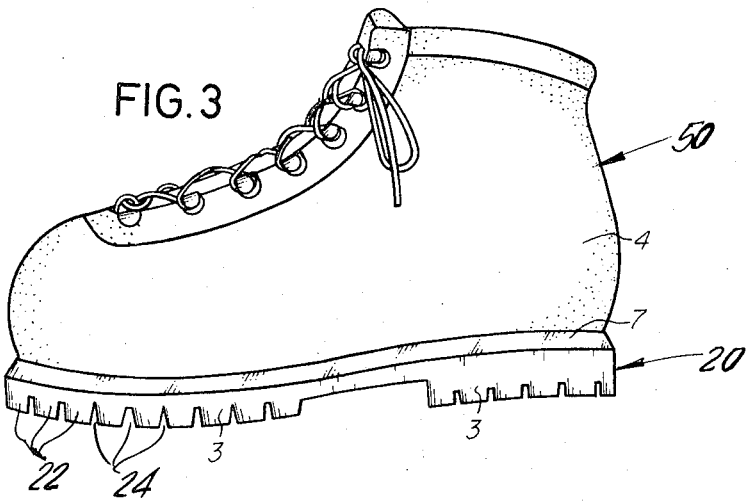
FIG. 3 is a side elevational view of a shoe formed by the method of the invention.

Referring to the drawings in particular, the invention embodied therein in FIGS. 1 to 3 shows the various steps in forming a finished shoe, generally designated 50.

In accordance with the invention, the bottom of the shoe is formed in a mold 1 by first applying a bottom layer, generally designated 20, into a mold recess 1a of a mold 1. This bottom layer 20 advantageously comprises a synthetic rubber, leather or similar material. An instep 4 of the shoe, which may advantageously comprise a leather or similar material, is mounted on the top of the mold 1, and it includes a lower periphery or inner folding edge 5 which projects downwardly into the mold recess 1a. With the inventive method, the instep 4 is held on the mold 1 so that it is spaced above the lower layer 20. This defines a receiving cavity 6 which extends the whole length and width of the shoe. A synthetic liquid resin is injected into the cavity 6 through an opening or gate 6' of the mold 1, and it forms a bonding layer or intermediate layer 7 which bonds the instep 4 to the bottom 20. The bottom layer 20 is advantageously provided with a corrugated bottom or a bottom formed with a series of projections 22 and recesses 24. An interior layer 11 is secured to or forms an integral part of the instep 4.

Figure 4:
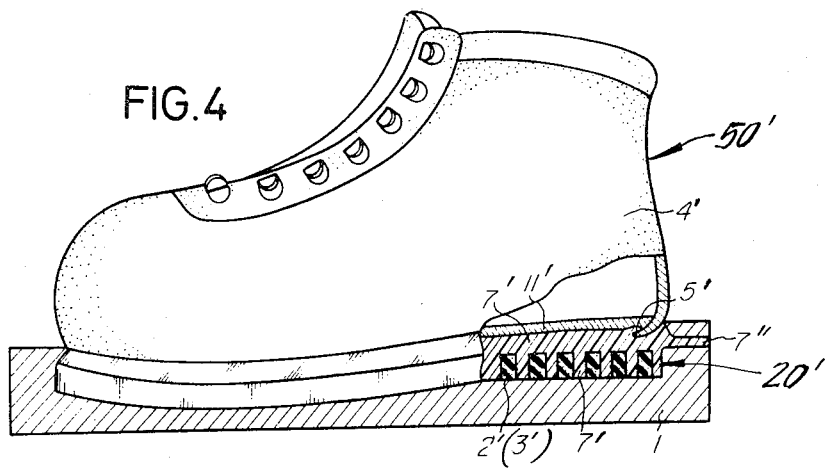
FIG. 4 is a partial side elevational and longitudinal sectional view showing a manufacturing step for forming a shoe of another embodiment of the invention.
Figure 5:
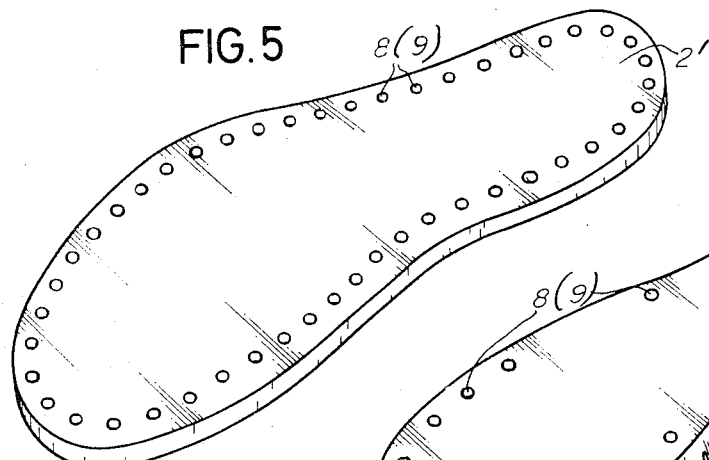
FIG. 5 is a top perspective view of the upper portion of a shoe bottom.
Figure 6:
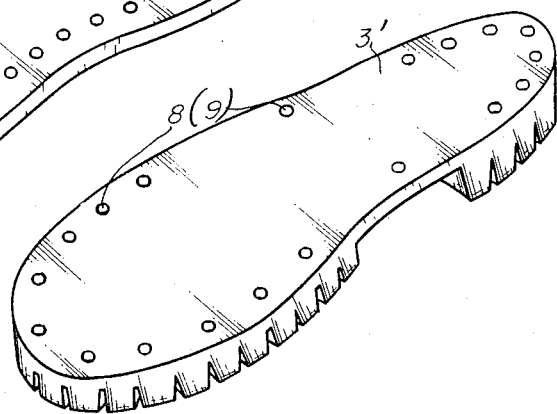
FIG. 6 is a top perspective view of a lower portion of a shoe bottom.

In the embodiment of the invention shown in FIGS. 4 to 6, there is provided a shoe, generally designated 50', which is made-up of similar parts to that shown in FIGS. 1 to 3. In the construction of FIG. 4, however, the bottom layer 20' is formed of an upper portion 2 and a lower portion 3, and the bonding material 7' extends through openings 8 of the upper part 2 into receiving openings or recesses 8 or 9 on the lower part 3, and becomes bonded to the materials of the upper and lower parts 2 and 3. Each upper part may include either through bores 8 or blind bores 9 for receiving the intermediate layer 7.

Figure 7:
FIGS. 7, 8 and 9 are partial sectional view showing various embodiments of the upper portion of the shoe bottom.
Figure 8:
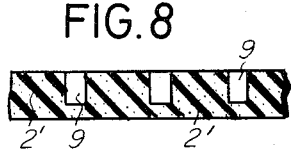
Figure 9:
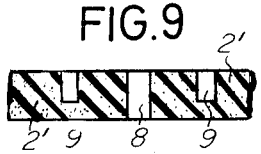

In the construction shown in FIGS. 7, 8 and 9, the upper part 2 is provided with through bores 8, blind bores 9, and a combination of through bores and blind bores 8 and 9, respectively.

Figure 10:
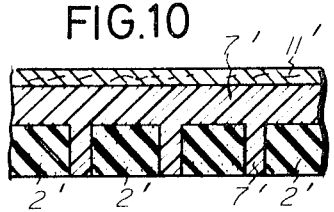
FIGS. 10, 11 and 12 are views corresponding to FIGS. 7, 8 and 9 showing the interconnection of the upper portion of the shoe bottom with an intermediate bonding layer.
Figure 11:
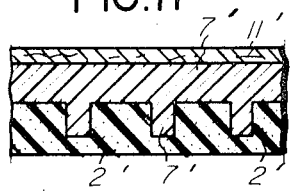
Figure 12:
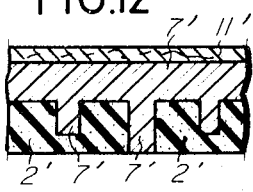

As shown in FIGS. 10, 11 and 12, the through bores may be completely filled with the synthetic material and the blind bores only fill to the depth of the blind bores for the corresponding embodiment shown in FIGS. 7, 8 and 9.

Figure 13:
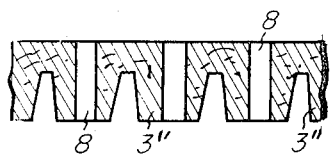
FIGS. 13, 14 and 15 are partial sectional views indicating various embodiments of the lower portion of the shoe bottom.
Figure 14:
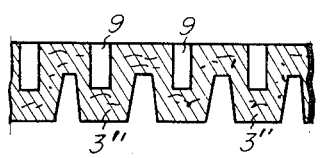
Figure 15:
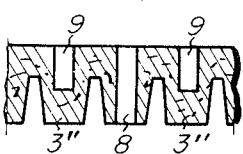
Figure 16:
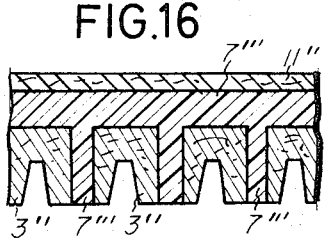
FIGS. 16, 17 and 18 are view corresponding to FIGS. 13, 14 and 15 with the bonding layer secured to the lower portion of the shoe bottom.
Figure 17:
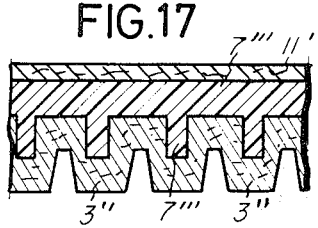
Figure 18:
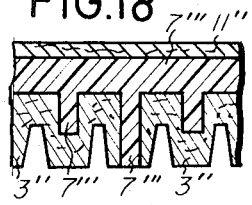
Figure 19:
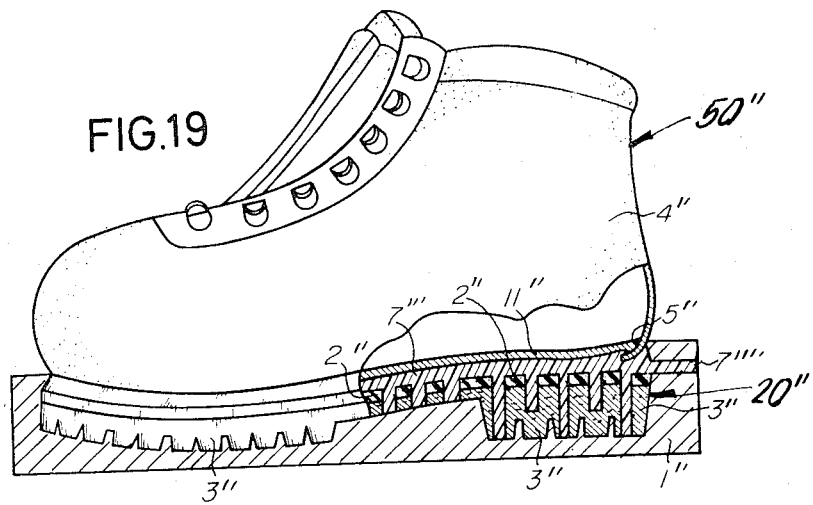
FIG. 19 is a side elevational view partly in section similar to FIG. 1 showing another embodiment of the invention.

In FIGS. 13, 14 and 15, there are shown various embodiments of the lower part in which either through bores 8, blind bores 9, or a combination of through and blind bores, are provided. FIGS. 16, 17 and 18 show the corresponding lower part bonded to the intermediate layer 7. In FIG. 19, there is shown a shoe 50'' in which the bottom 20'' is formed of a combination of an upper part 2 and a lower part 3 with the intermediate bonding material 7'' extending into blind bores and also into through bores.

Figure 20:
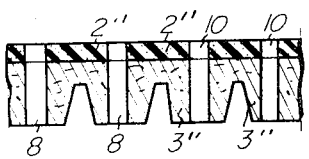
FIGS. 20, 21 and 22 are sectional view showing the interconnection of the upper and lower portions of the shoe bottom.
Figure 21:
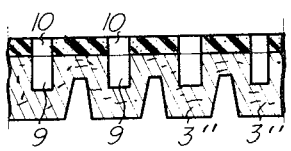
Figure 22:
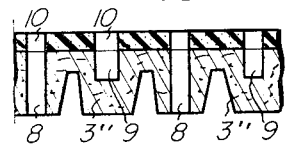
Figure 23:
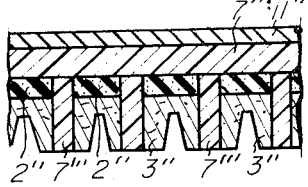
FIGS. 23, 24 and 25 are views showing the interconnection of the upper and lower portions of the shoe bottom with the bonding layer.
Figure 24:
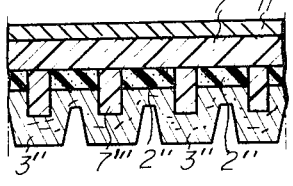
Figure 25:
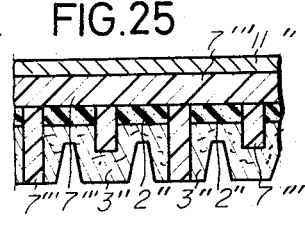

FIGS. 20, 21 and 22 indicate the manner in which the various blind and through bores may be oriented together in order to permit the bonding materials 7'' to flow between the upper and lower parts. In FIGS. 20, 21 and 22, the numeral 10 is applied to designate the through bores of the upper part 2 which align with the bores or recesses of the lower part 3.

While specific embodiments of the invention have been shown and described in detail to illustrate the application of the principles of the invention, it will be understood that the invention may be embodied otherwise without departing from such principles.

What is claimed is:

1. A method of manufacturing a shoe using a mold having a shoe bottom recess, comprising applying a bottom layer into the mold recess to locate it at the bottom of the mold recess, mounting a shoe in step on the top of the mold so that its peripheral edge extends into the mold recess and it is spaced from the bottom layer, and injecting a liquid synthetic hardenable material into the mold between the shoe instep and the bottom layer to form an intermediate bonding layer bonding said instep and the bottom layer together, said bottom layer comprising an upper and lower part which are superimposed together and with the upper part having at least one opening therethrough and the lower part having at least one recess aligned with the opening, and wherein the bonding layer is applied so as to penetrate through the opening of the upper part into the recess of the lower part to bind the upper and lower parts together with the insert.

2. A method of manufacturing a shoe, according to claim 1, wherein said upper part includes at least one blind bore receiving the bonding layer.

3. A method of manufacturing a shoe, according to claim 1, wherein said lower part includes at least one blind bore receiving the bonding layer.

4. A method of manufacturing a shoe, according to claim 1, wherein said upper part includes a plurality of openings arranged around its periphery, said lower part having a plurality of bores aligned with respective openings arranged around its periphery and wherein the bonding layer penetrates the openings of the upper part and extends into the bores of the lower part.

5. A method of manufacturing a shoe, according to claim 4, wherein the lower part includes alternately arranged through bores and blind bores aligned with the openings of said upper part.

6. A shoe construction, comprising a shoe instep having a peripheral lower portion, a shoe bottom spaced from said lower portion and an intermediate bonding layer extending between said bottom and said instep and bonding said instep to said bottom, said bottom layer comprising an upper and lower part, said upper part having at least one through opening therein and said bottom part having at least one receiving recess aligned with the opening, the bonding material extending through the opening and into the upper part and into the recess of the lower part.

7. A shoe construction, according to claim 6, wherein said upper part includes a plurality of openings arranged at spaced locations in a marginal area around its periphery, said lower part having receiving recesses aligned with each of said openings and the bonding material extending through said openings and into said recesses.

8. A shoe construction, according to claim 6, wherein said bottom layer comprises two superposed portions, each having a plurality of aligned openings and receiving recesses into which said bonding material extends, said bottom layer having a corrugated sole with the bonding material extending into the sole.

* * * * *